W. J. ASHCRAFT.
DISTANCE MEASURING DEVICE.
APPLICATION FILED JULY 2, 1912.
1,099,157.
Patented June 9, 1914.
2 SHEETS—SHEET 1.
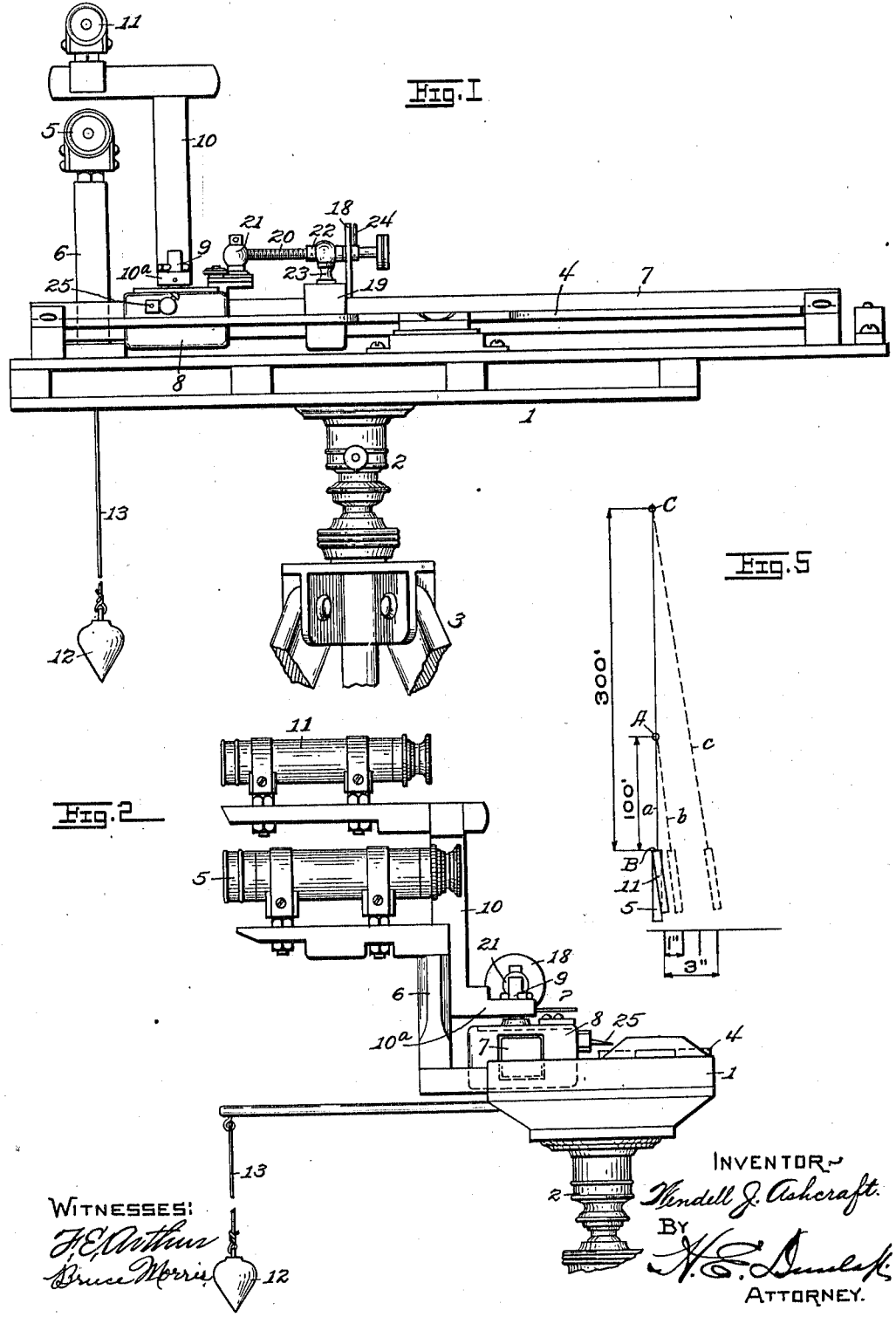

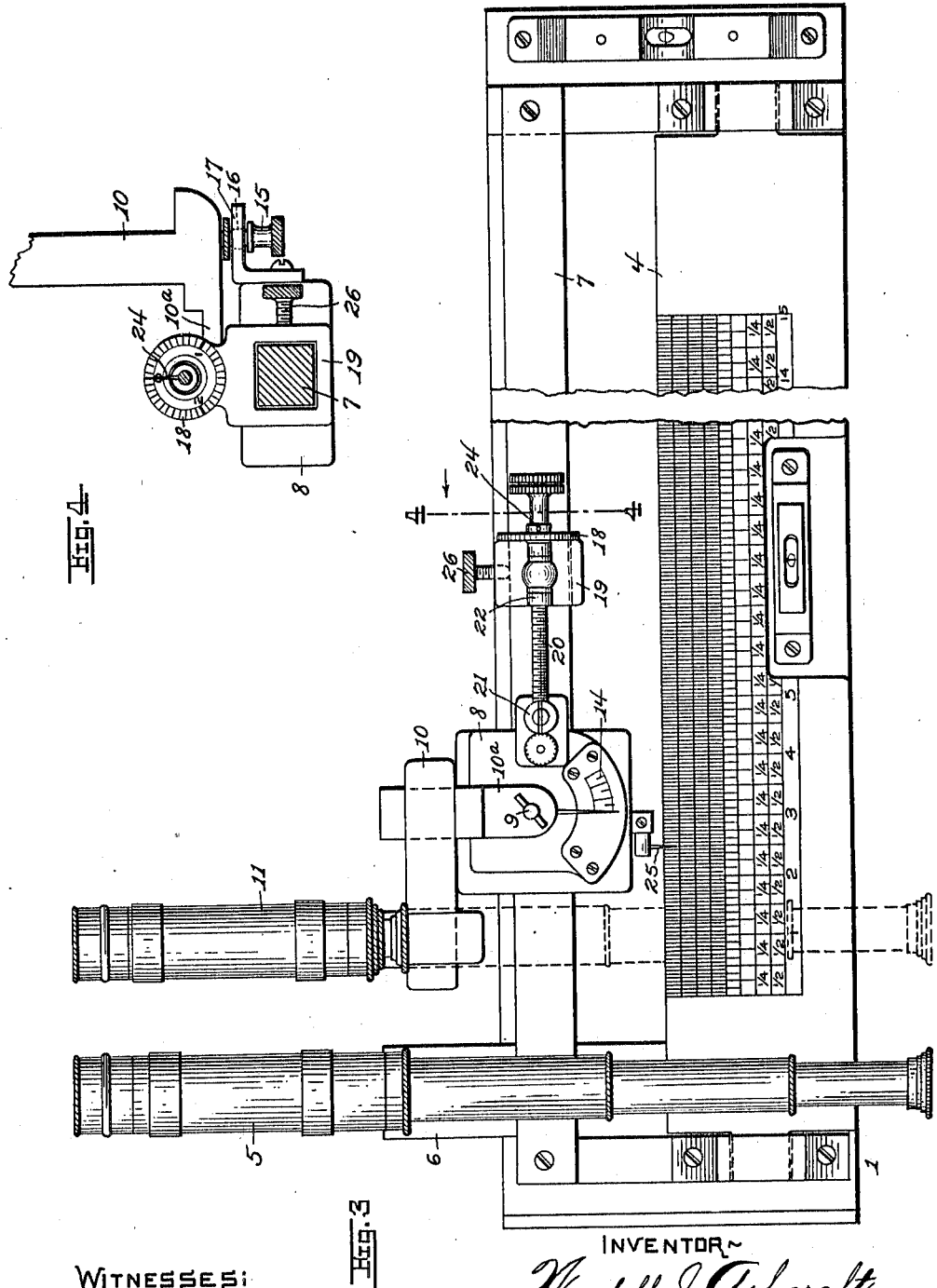

UNITED STATES PATENT OFFICE.

WENDELL J. ASHCRAFT, OF SHORT CREEK, WEST VIRGINIA, ASSIGNOR OF ONE-HALF TO L. W. McCLURE, OF SHORT CREEK, WEST VIRGINIA.

DISTANCE-MEASURING DEVICE.

1,099,157.  Specification of Letters Patent. Patented June 9, 1914.

Application filed July 2, 1912. Serial No. 707,207.

*To all whom it may concern:*

Be it known that I, WENDELL J. ASHCRAFT, a citizen of the United States of America, and resident of Short Creek, county of Brooke, and State of West Virginia, have invented certain new and useful Improvements in Distance - Measuring Devices, of which the following is a specification.

This invention relates to distance measuring devices, and more particularly to an instrument whereby the distance between the instrument, or a sighting point, and a distant object may be determined.

The primary object of the invention is to provide a simple instrument or apparatus for accurately indicating the distance between a sighting point and a distant object, such distance being indicated and readable on the instrument either in terms of length or in terms readily translatable into terms of length.

A further object is to provide an instrument of the character mentioned which is especially adapted for use in surveying, being of such size and weight as to be conveniently transportable from place to place and being adapted to be readily and conveniently set up for use.

With these and other objects in view, the invention resides in the features of construction, arrangement of parts and combinations of elements which will hereinafter be fully described, reference being had to the accompanying drawings, forming a part of this specification, in which—

Figure 1 is a rear elevation of the invention; Fig. 2 is an end elevation of the same; Fig. 3 is a slightly enlarged top plan view of the same; Fig. 4 is a section on the line 4—4, Fig. 3; and Fig. 5 is a diagram illustrating the method of operation.

Referring to said drawings, in which like designating characters distinguish like parts throughout the several views—1 indicates generally a horizontally disposed frame which may be of any appropriate form or design having a supporting stem 2, the latter being preferably of an adjustable ball and socket type adapted for mounting upon a stand or tripod 3. A table or plate 4 is rigidly mounted in a horizontal position on said frame and has its top face provided with graduations, as shown in Fig. 3, the purpose of which will presently be described. Mounted on said frame adjacent to one end thereof so as to occupy a position at a direct right angle to the graduated plate 4 is a stationary telescope 5, a suitable upright fixed supporting bracket, as 6, being preferably provided therefor. Located in front of and parallel to said plate 4 and having its opposite ends suitably mounted on the frame 1 is a stationary horizontal bar 7, preferably rectangular in cross section, having mounted thereon a longitudinally slidable member or slide-block 8 on which is pivoted, as shown at 9, the base member 10$^a$ of an angular supporting bracket 10 having rigidly mounted thereon a telescope 11 which is adapted, in one position of the slide-block and bracket 10, to directly overlie said telescope 5.

When it is desired to determine or measure the distance between two points, the instrument is mounted so that a plumb 12, carried by a line 13 in the vertical line passing through the objective end of the stationary telescope 5, stands directly over one of the points, which latter may be termed the sighting point, and so that the distant point or object is in the line of sight through said telescope 5. The movable telescope 11 having been previously adjusted to an angle with respect to the stationary telescope, so that movement thereof along the bar 7 a certain distance, as one inch, from the point in which the objective ends of both are in the vertical line through the sighting point, will cause the lines of sight to intersect at a certain known distance, as 100 feet, from the sighting point, the said movable telescope is moved along said bar 7 until the distant object appears in the line of sight thereof. The distance between the points may then readily be determined by multiplying the known distance between the sighting point and the intersecting lines of sight with a certain length of movement by the movement reading on the plate.

Referring specifically to Fig. 5, the telescopes 5 and 11 are shown in full lines in initial position with their objective ends in the same vertical line, the telescope 11 occupying such an angle with respect to telescope 5 that movement of the latter the distance of one inch causes the lines of sight *a* and *b* to intersect at a point A distant 100 feet from the sighting point B. To determine the distance from B to a distant object C, the telescope 11 is moved until its line of sight *c* intersects at said object the line of sight of telescope 5 focused on said object. Then, multiplying the known distance measured by a given movement, that is, 100 feet to 1 inch of movement, by the length of movement indicated on the scale, 3 inches, it is found that the object C is 300 feet distant from the sighting point B.

The slide-block preferably bears thereon an arcuate scale 14 which, as is obvious, may bear degree indications showing the angle of inclination of the telescope 5, or may bear distance indications showing the distances from the vertical focal line through the sighting point to the intersecting lines of sight at different angles of inclination ascertained or indicated by a certain length of movement of the telescope 11. A set screw 15, clearly shown in Fig. 4, is directed upward through a slot 16 provided in a plate 17 fixed on the slide-block and has its point seated in the under side of the base member 10ª of the supporting bracket 10, said set screw being adapted to be caused to impinge upon said plate 17 for locking said supporting bracket in adjusted position.

As is obvious, the plate 4 may be graduated in inches and fractions thereof, as shown, for indicating the length of movement of the movable telescope 11 along the bar 7; or, it may have distances recorded thereon so that measured distances may be directly readable thereon, as when the telescope 11 is mounted at a fixed angle with respect to telescope 5.

To avoid the necessity for the use on plate 4 of graduations which, in order to be accurately readable in feet and inches, would necessarily be exceedingly minute and delicate on a plate of convenient length, a micrometer adjustment and indicating dial are provided. Said dial, designated 18, is mounted upon a second slide-block 19 which is slidable upon the bar 7. A screw 20 with micrometer threads and having its point swiveled in a socket-post 21, carried by the slide-block 8, is threaded through a sleeve 22 fixed on a post 23 carried by the slide-block 19. Said screw has an index finger or indicator 24 adapted to rotate over the face of said dial as the screw is turned.

In practice, the telescope 11 is moved to the point where its line of sight intersects or converges with that of the telescope 5 directly at the distant object. Then, provided the index finger or indicator 25 carried at a suitable point, as on the slide-block 8, does not indicate a graduation on the plate 4 which permits an exact reading, the slide-block is moved forward or backward, as preferred, to the nearest graduation which does permit of such reading. Then, a set-screw 26 carried by the slide-block 19 is set to impinge on bar 7 for maintaining or locking said slide-block in fixed position, whereupon, by manipulation of the micrometer screw 20, the slide-block 8 is moved until the lines of sight again intersect on the distant object. By counting the number of revolutions and fractions thereof made by the indicator 24 over the face of the dial 18, the number of feet and inches to be added or subtracted, as the case may be, from the reading taken on the plate 4, the distance is accurately determined. As depicted in Fig. 4, the dial is graduated to indicate 3 feet for each revolution of the micrometer screw; hence, assuming that three and one-half revolutions of said screw is required to move the telescope 11 forward to the point where its line of sight intersects at the object with the line of sight of the telescope 5, the distance reading ascertained on the plate 4 would require to be increased by 10 feet 6 inches.

It will be understood that various slight modifications in the construction of the instrument hereinbefore described may be resorted to without departing from the general spirit or scope of the invention as defined in the appended claim. It will also be obvious that various types of graduations whereby distances may be directly indicated on the instrument itself, or from which they may be readily computed, may suggest themselves to those skilled in the art. Hence, I do not desire to be understood as limiting myself to the precise structural details or to the type of graduations herein shown and described.

Having thus described my invention, what I claim as new, and desire to secure by Letters Patent, is—

In an instrument for measuring distances, a support, a bar mounted on said support, a telescope fixed at a right angle to said bar, a slide-block embracing and slidably mounted on said bar, a second telescope pivotally mounted on said slide-block and, when occupying zero position, having its line of sight intersecting that of the fixed telescope at a known distance from the sighting point, an index finger carried by said slide-block, a plate provided with a scale adapted to be traversed by said finger and on which, when said movable telescope is adjusted to cause its line of sight to intersect that of the fixed telescope on a distant object, is indicated the approximate distance of such object from the sighting point, said slide-block being provided with a calibrated scale whereon the angular adjustment of said movable telescope is indicated, a second slide-block slidably mounted on said bar, an indicating dial mounted on said second slide-block, a micrometer screw connecting said slide-blocks, and means for fixing said second slide-block with respect to said bar.

In testimony whereof I affix my signature in presence of two subscribing witnesses.

WENDELL J. ASHCRAFT.

Witnesses:
H. E. DUNLAP,
L. D. MORRIS.